United States Patent Office 3,155,581
Patented Nov. 3, 1964

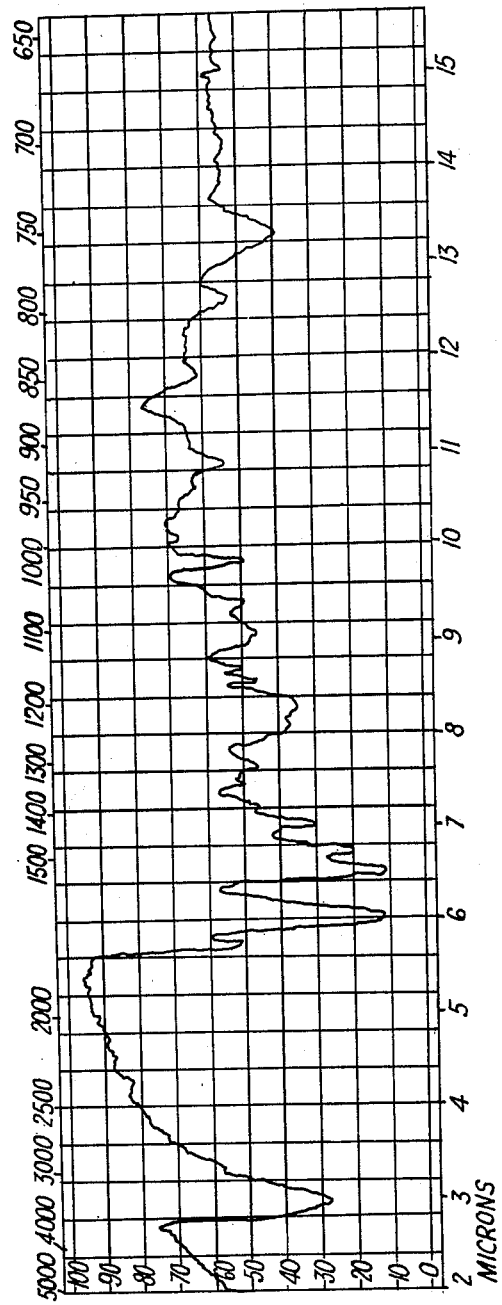

3,155,581
ANTIBIOTIC AND PRODUCTION THEREOF
Sylvie Pinnert, Léon Ninet, and Jean Preud'homme, Paris, France, assignors to Rhone-Poulenc S.A., Paris, France, a French body corporate
Filed Feb. 16, 1962, Ser. No. 173,770
Claims priority, application France Feb. 24, 1961
6 Claims. (Cl. 167—65)

The present invention relates to a new antibiotic, designated hereinafter by the number 9671 RP. This new product has important antibacterial activity against Gram-positive organisms and more especially staphylococci and streptococci.

This new antibiotic is produced by the culture under artificial conditions of a micro-organism, hereinafter identified more completely, belonging to the genus Streptomyces and designated "Streptomyes 40037" or "Streptomyces actuosus." A specimen of this micro-organism has been deposited in the United States Department of Agriculture, North Regional Research Laboratory at Peoria, Illinois, United States of America, and is identified by the Culture Collection Number NRRL 2954.

According to a first feature of the present invention, therefore, there is provided an antibiotic, herein designated 9671 RP, which is a yellow substance, crystallising as fine needles, melting point 310–320° C. with decomposition on a Maquenne block and having an optical rotation $[\alpha]^{20}_D = +38°$ (C.=1, pyridine), analysing with the elementary composition C, 49.6%; H, 4.0%; O, 16.7%; N, 14.4%; S, 15.75–15.80%, having an ultra-violet spectrum in solution in water containing dimethylformamide exhibiting two absorption maxima at $$242 \text{ m}\mu \ (E^{1\%}_{1\text{cm.}} = 525) \text{ and } 322 \text{ m}\mu \ (E^{1\%}_{1\text{cm.}} = 229)$$

exhibiting the following principal infra-red absorption bands, shown in Table I:

TABLE I

| | |
|---|---|
| 3350 strong | 1150 medium |
| 3125 shoulder | 1112 shoulder |
| 2930 shoulder | 1101 medium |
| 1745 medium | 1061 medium |
| 1655 very strong | 1017 medium |
| 1532 very strong | 990 weak |
| 1484 strong | 940 weak |
| 1425 medium | 918 medium |
| 1385 weak | 890 shoulder |
| 1342 medium | 843 medium |
| 1308 medium | 822 weak |
| 1235 medium | 790 medium |
| 1210 medium | 752 strong |
| 1168 medium | | the said antibiotic being soluble in chloroform, dioxane, pyridine, dimethylformamide and dimethylsulphoxide, slightly soluble in methanol, ethanol, ethyl acetate and benzene and insoluble in water and petroleum ether.

Referring to the foregoing data, the ultra-violet absorption spectrum is conveniently determined using a solution of 10 $\mu$g./cm.$^3$ of the antibiotic in water containing 1% of dimethylformamide, and the infra-red absorption spectrum is conveniently determined using tablets containing the antibiotic and potassium bromide.

The infra-red absorption spectrum of the antibiotic is shown in the accompanying drawing, where the abscissae represent both the weavelengths expressed in microns (lower scale) and the wave numbers in cm.$^{-1}$ (upper scale) and the ordinates represent percentage transmission.

The antibiotic 9671 RP gives negative results in the following reactions: biuret reaction, Sakaguchi reaction, ninhydrin, reaction, Millon reaction, Folin-Denis reaction, ferric chloride reaction, Molisch reaction, Fehling's solution reaction, Tollens reaction, Ehrlich reaction, ferric maltol reaction and Zimmermann reaction. It gives a positive result to the ninhydrin reaction after hydrolysis, thus demonstrating the existence of a polypeptide chain.

The antibiotic 9671 RP may be identified by paper chromatography. The antibiotic has been chromatographed on Arches No. 302 paper impregnated with M/15 phosphate buffer at pH 7, descending development being carried out by means of different solvents or mixtures of solvents. The chromatograms are developed by bioautography on nutritive agar plates seeded with S. aureus or B. subtilis. The Rf values obtained are given in Table II:

TABLE II

| Development Solvent (Upper layer of mixtures of various constituents) | Rf |
|---|---|
| Benzene+n-Butanol+Water (95:5:25 by volume) | 0.15 |
| Ethyl Acetate+Methyl Isobutyl Ketone+Water (20:80:25 by volume) | 0.15 |
| Ethyl Acetate+Methyl Isobutyl Ketone+Water (50:50:25 by volume) | 0.30 |
| Ethyl Acetate+Benzene+Water (40:60:25 by volume) | 0.05 |
| Cyclohexane+n-Butanol+Water (80:20:25 by volume) | 0 |
| Ethyl Acetate Saturated with Water | 0.50 |

The bacteriostatic activity of 9671 RP against organisms has been determined by a dilution method currently used for this purpose. The lowest concentration of substance has been determined for each organism which prevents all visible development in an appropriate nutritive medium. The results obtained in the various determinations have been collected in Table III below, wherein the minimal bacteriostatic concentrations are expressed in micrograms of substance per cm.$^3$ of experimental medium.

TABLE III

| Test Micro-organism | Minimal Bacteriostatic Concentration, $\mu$g./cm.$^3$ |
|---|---|
| Staphylococcus aureus strain 209 P—ATCC 6538 P | 0.0009 |
| Staphylococcus aureus strain 133 (Pasteur Institute) | 0.0019 |
| Staphylococcus aureus strain B$_3$ (streptomycin and penicillin resistant) | 0.003 |
| Staphylococcus aureus strain H$_b$ (tetracycline and penicillin resistant) | 0.003 |
| Staphylococcus aureus strain Launoy 1 (tetracycline, streptomycin, chloramphenicol and penicillin resistant) | 0.0038 |
| Staphylococcus aureus strain Launoy 2 (tetracycline, streptomycin and penicillin resistant) | 0.0021 |
| Staphylococcus aureus strain Beaujon 3 (tetracycline, streptomycin, chloramphenicol and penicillin resistant) | 0.003 |
| Staphylococcus aureus strain 2700R—streptothricin resistant | 0.0025 |
| Staphylococcus aureus strain 1142R—congocidin resistant | 0.0005 |
| Staphylococcus aureus strain 3486R—spiramycin resistant | 0.0009 |
| Staphylococcus aureus carbomycin resistant strain | 0.0005 |
| Staphylococcus aureus erythromycin resistant strain | 0.0033 |
| Staphylococcus aureus chloramphenicol resistant strain | 0.0012 |
| Staphylococcus aureus novobiocin resistant strain | 0.001 |
| Staphylococcus aureus actinomycin resistant strain | 0.0012 |
| Micrococcus citreus—ATCC 8411 | 0.0038 |
| Micrococcus lysodeikticus—ATCC 4698 | 0.003 |
| Gaffkya tetragena (Fac. Phie) | 0.0042 |
| Sarcina lutea—ATCC 9341 | 0.0011 |
| Sarcina alba (Fac. Phie) | 0.0019 |
| Streptococcus faecalis (Thiercelin Fac. Phie enterococcus) | 0.0106 |
| Streptococcus faecalis—ATCC 9790 | 0.0007 |
| Streptococcus viridans (Institut Pasteur) | 0.0065 |
| Streptococcus pyogenes hemolyticus (Dig. 7 Institut Pasteur strain) | 0.00028 |
| Diplococcus pneumoniae (Til strain, Institut Pasteur) | 0.00015 |
| Neisseria catarrhalis (Fac. Phie) | 0.0017 |
| Lactobacillus casei—ATCC 7469 | 0.0007 |
| Bacillus subtilis—ATCC 6633 | 0.003 |
| Bacillus subtilis—(strain ZO 5 A, Fac. Phie) | 0.01 |
| Bacillus subtilis—(strain 3 R 9675, Merck)—ATCC 9524 | 0.13 |
| Bacillus cereus—ATCC 6630 | 0.0071 |
| Bacillus brevis—ATCC 2185 | >138 |
| Bacillus mycoides | 0.0043 |
| Mycobacterium smegmatis—ATCC 607 | >138 |
| Mycobacterium smegmatis—ATCC 607 NR (neomycin resistant strain) | 5.07 |
| Mycobacterium smegmatis—ATCC 607 SR (streptomycin resistant strain) | >138 |

TABLE III—Continued

| Test Micro-organism | Minimal Bacteriostatic Concentration, μg./cm.³ |
|---|---|
| *Mycobacterium phlei*—(Institut bacteriologique de Lyon) | 0.17 |
| *Mycobacterium para-smegmatis* (A75—Lausanne) | 19.2 |
| *Escherichia coli*—ATCC 9637 | >138 |
| *Shigella dysenteriae*—Shiga L. (Institut Pasteur) | >138 |
| *Salmonella typhimurium* (Institut Pasteur) | >138 |
| *Salmonella paratyphi A* (Lacasse, Institut Pasteur) | >138 |
| *Salmonella schottmuelleri* (*paratyphi B*)—(Fougenc, Institut Pasteur) | >138 |
| *Bacillus lactis aerogenes* (Fac. Phie) | >138 |
| *Aerobacter aerogenes*—ATCC 8308 | >138 |
| *Alcaligenes faecalis*—ATCC 8740 | 0.0015 |
| *Proteus vulgaris* (Fac. Phie) | >138 |
| *Proteus X 19* | >138 |
| *Klebsiella pneumoniae*—ATCC 10031 | >138 |
| *Serratia marcescens* (A. 476, Lausanne) | >138 |
| *Pseudomonas aeruginosa* (Bass strain—Institut Pasteur) | >138 |
| *Brucella bronchiseptica* (CN 387—Welcome Institut) | >138 |
| *Pasteurella multocida* (A. 125, Institut Pasteur) | 0.0024 |

These results taken together show that 9671 RP is principally active against Gram-positive bacteria. In addition, 9671 RP is active against staphylococcal strains rendered resistant to one or more of the following antibiotics: penicillin, streptomycin, tetracycline, choramphenicol, erythromycin, novobiocin, actinomycin, steptothricin, congocidin, spiramycin and carbomycin.

9671 RP is inactive against the following yeast-like or filamentary fungi: *Pestalotia palmarum*, *Saccharomyces pastorianus*, *Stemphylium radicinum*, *Aspergillus niger*, *Candida albicans*, *Botrytis cinerea*, *Fusarium oxysporum* and *Penicillium chrysogenum*.

In addition, it has been demonstrated in the laboratory that 9671 RP is particularly active against staphylococcal infections of the mouse when administered in situ. The toxicity of the antibiotic has been studied principally in the mouse. The maximal tolerated dose, i.e., the maximal dose for which no deaths are recorded amongst the animals ($LD_0$), has been determined by sub-cutaneous, oral and intra-peritoneal administration of the product, with the following results:

Sub-cutaneous administration, $LD_0$ above or equal to 1 g./kg.
Oral administration, $LD_0$ above or equal to 2.5 g./kg.
Intra-peritoneal administration, $LD_0 = 0.5$ g./kg.

Of low toxicity in the mouse and well tolerated in the rabbit on application to mucous membrane, this product is a therapeutic agent of choice for the local treatment of infections caused by Gram-positive cocci in animals. In particular, it is very effective in the treatment of the mastitis of the cow. It may be also used as a food additive.

As noted above, the organism which produces the antibiotic 9671 RP belongs to the genus Streptomyces and is designated by the Culture Collection Number NRRL 2954. It is herein referred to as *S. actuosus*.

This organism was isolated from a soil fragment taken near Corrientes in Argentina. The method of isolation was as follows: the soil sample was suspended in sterile distilled water and the suspension then diluted to different concentrations. A small volume of each dilution was spread on the surface of Petri dishes containing Emerson's nutritive medium or any other appropriate medium. After incubation at 26° C. for several days, the colonies of micro-organisms which it is desired to isolate are transplanted to agar slopes to produce more abundant cultures. No description of a species having culture characteristics and biochemical properties coinciding with those of *S. actuosus* can be found in the classification of the genus Streptomyces in "Bergey's Manual of Determinative Bacteriology," 7th Edition (1957). For this reason, this organism may be considered to be a new species. The name "*Streptomyces actuosus*" has been given to it because of its great activity and the following are its properties:

Microscopic Morphology

Cultures on thin plates of Bennett's medium examined under the microscope show the formation of branched mycelial filaments as well as spore chains characteristic of the genus Streptomyces. The mycelial filaments carry very numerous spore chains. The spore-bearing filaments are sinuous and of varying lengths. The spores are oval and about $1\mu$ in breadth and about $1.5\mu$ in length. The mycelial filaments are more slender than the spore-bearing filaments and are about 0.6 to $0.8\mu$ in breadth.

General Characteristics

On those media described as "synthetic" *S. actuosus* presents in general a colourless to pale orange vegetative mycelium and produces no soluble pigment or weak ochre or brown pigments. On those media described as "organic" it presents a vegetative mycelium the colour of which ranges from yellow-brown to dark brown and soluble pigments of a brown which is more or less intense according to the medium and the age of the culture. Aerial mycelia do not appear on all media. When they are produced they are always white at the commencement of their development and then become medium grey in colour.

Form of Isolated Colonies

Monospore cultures in Petri dishes on Bennett's medium take the form of round colonies without ragged edges. These colonies are somewhat convex and may possess a central button. The vegetative mycelium forms numerous ray-like folds. It is pale orange in colour as is its underside. The aerial mycelium appears rather early. At first white, it then changes with the degree of development to become medium grey in colour when it is mature. It forms a light brown pigment in agar.

Culture Characteristics and Biochemical Properties

The culture characteristics and biochemical properties of *Streptomyces actuosus* have been determined on the nutritive agars and nutritive broths customarily used to identify strains of Streptomyces. The observations made are recorded in Table IV below. They relate to cultures incubated at 26° C. for 27 days. The majority of the culture media employed were prepared according to the formulae contained in "The Actinomycetes" by S. A. Waksman, pp. 193–197, Chronica Botanica Company, Waltham (Mass.), United States of America, 1950. Where this is the case, they are indicated by the number given to them in "The Actinomycetes."

TABLE IV

| Culture Medium | Degree of Development | Vegetative Mycelium | Aerial Mycelium | Soluble Pigment | Biochemical Properties |
|---|---|---|---|---|---|
| Bennett's Agar (Ref. A) | Good | Lightly folded, slightly efflorescent. | Abundant; medium grey | Brown and of medium intensity. | |
| Glycerin-Asparagine Agar (3). | Moderate | Colourless | Slight, white growing to medium grey. | Weak and of ochre colour. | |
| Synthetic Agar (Starch-Mineral Salts) (Ref. J). | do | Colourless, slightly efflorescent. | Slight, initially white then becoming medium grey. | Weak and of yellow-ochre colour. | |
| Maltose-Tryptone Agar (ref. B). | Vigorous | Thick and strongly pigmented (black); folded. | White, chalky appearance becoming medium grey. | Intense and brown | |

TABLE IV—Continued

| Culture Medium | Degree of Development | Vegetative Mycelium | Aerial Mycelium | Soluble Pigment | Biochemical Properties |
|---|---|---|---|---|---|
| Synthetic Agar (Czapek's Medium) (1). | Good | Colourless, slightly efflorescent. | Abundant, begins to become grey very shortly after its appearance but remains pale. | Rather abundant and ochre. | |
| Synthetic Agar with Glucose (ref. C). | do | do | White, powdery, becoming very pale grey. | Rather abundant and ochre. | |
| Emerson's Agar (23) | do | Folded and brilliant clear brown. | Greyish white | Clear brown | |
| Glucose-Asparagine Agar (2). | Moderate | Colourless | Clear grey with several small white bunches. | None | |
| Nutritive Agar (5) | Weak | Mat, ochre, brown, yellow. | Absent | Ochre, brown, yellow | Formation of crystals in the agar. |
| Glucose Agar (7) | Good | Smooth, brilliant | At first greyish white, chalky appearance, becoming pale grey very slightly rose-tinted but with clear and dark zones, the clear zones predominating. | None | |
| Agar with Starch (10) | Moderate | Colourless or pale orange. | White, becoming medium grey. | Rose ochre | |
| Agar with Calcium Malate (ref. D). | do | Colourless | do | None | Solubilisation of calcium malate. |
| Agar with Tyrosine (ref. E). | do | Clear brown | Absent | Brown | No solubilisation of the tyrosine. |
| 12% Pure Gelatine (Ref. F). | do | Flakes on the surface of the gelatine. | do | Yellow brown | Liquefaction of ⅙ of the depth in 12 days; of ⅔ of the depth in 27 days. |
| Potato (27) | Vigorous | Folded | White at the edges; medium grey at the centre. | Yellow exudate, in droplets on the surface of aerial mycelia; brown soluble pigment. | |
| Starch Solution (19) | Moderate | Granular cloudiness at the surface; flakes at the bottom, for the most part clinging to the walls of the tube. | Absent | None | Hydrolysis of the starch is not complete in 12 days (reaction to iodine iodide solution); after 27 days only dextrins remain. |
| Czapek's Broth (18) | do | Flakes at the bottom of the tube. | do | Slight and yellow, more intense towards the surface than at the bottom. | |
| Czapek's Broth with Glucose (ref. G). | do | do | do | do | |
| Nitrated Nutritive Broth (ref. H). | Moderate | Granular cloudiness at the surface and small colonies at the bottom adhering to walls. | do | None | Positive reaction for nitrites. |
| Skimmed Milk (ref. K) | Good | Cloudy and dark brown ring. | Traces, white | At first dark brown near the surface, clearer at the bottom. The brown pigment then spreads throughout the entire medium. | On the 12th day no coagulation, pH 6.8. On 27th day peptonisation is complete, pH 7.2. |

References to or constitutions of media not described in "The Actinomycetes":

A. K. L. Jones, J. Bacteriology, 57, 142 (1949).
B. A. H. Williams, E. McCoy, App. Microbiology, 1, 307, (1953).
C. Obtained by replacing the sucrose in the formula given by Waksman for "Czapek's synthetic sucrose agar" (1) by glucose (3%).
D. Calcium malate 1%; $NH_4Cl$ 0.05%; $K_2HPO_4$ 0.05%; agar 2%.
E. Peptone 0.5%; meat extract 0.3%; tyrosine 0.5%; agar 2%.
F. "Plain gelatine" prepared according to the instructions in the "Manual of Methods for Pure Culture Study of Bacteria" of the Society of American Bacteriologists ($II_{50-18}$).
G. Obtained by replacing the sucrose in the formula given by Waksman for "Czapek's sucrose broth" (18) by glucose (3%).
H. Following the formula given in the "Manual of Methods for Pure Culture Study of Bacteria" of the Society of American Bacteriologists ($II_{50-18}$).
J. Grundy et coll.: Antibiotics and Chemotherapy, 1, 309, (1951).
K. Prepared from Gayelord Hauser skimmed-milk powder according to instructions given.

*Utilisation of Various Hydrocarbon Substances*
(According to the method of Pridham, T. G. and Gottlieb, D., J. Bacteriology, 56, 167 [1948])

The cultures are carried out on agar slopes. Incubation is at 26° C. Among the substances inducing a rapid growth, complete with the formation of aerial mycelia and spores in 10 days are: glucose, maltose, lactose, sucrose, starch, dextrin, xylose, raffinose, ribose, inulin, fructose, mannose, arabinose, rhamnose, galactose, mannitol, inositol, meso-inositol, glycerol, sodium acetate, sodium citrate and succinic acid.

Sorbose, sorbitol, erythritol, adonitol and dulcitol do not allow development or allow only an extremely restricted development. It can thus be said that these substances are not utilised.

*Comparison of S. Actuosus and Two Strains of Streptomyces Described in "Bergey's Manual of Determinative Bacteriology"*

These two strains, Streptomyces fasciculus (originally described by Krassilnikov) and Streptomyces carnosus (described by Millard and Burr), are those which most closely approach the strain here referred to as Streptomyces actuosus.

The differences in culture characteristics and biochemical properties are listed in Table V.

TABLE V

| | S. fasciculus | S. carnosus | S. actuosus |
|---|---|---|---|
| Spore-bearing filaments | Straight | | Sinuous. |
| Spore form | Oblong | Cylindrical | Oval. |
| Synthetic agar with sucrose (I) | | Vegetative mycelium pale smoky grey—exudate colourless in droplets over entire surface. | Vegetative mycelium colourless; no exudate. |
| Synthetic agar with glucose (C) | | Vegetative mycelium pale olive grey. | Vegetative mycelium colourless. |
| Nutritive agar (5) | Aerial mycelium little developed, grey. | | No aerial mycelium. |
| Gelatine (F) | Medium liquefaction | Rapid liquefaction | Liquefaction slow and incomplete. |
| Milk (K) | Rapid coagulation and peptonisation. | Coagulation followed by liquefaction. | No coagulation; peptonisation slow. |
| Starch (19) | Rapid hydrolysis | Hydrolysis | Hydrolysis slow and incomplete (stops at dextrin stage). |
| Nitrate (H) | Weak reduction to nitrite | Reduction | Good reduction. |

According to a further feature of the present invention, the antibiotic 9671 RP defined above is prepared by culturing S. actuosus or a mutant thereof in a nutritive medium and separating the antibiotic 9671 RP thus formed.

The culture of S. actuosus may be carried out by any method of surface or submerged aerobic culture but the latter is preferred for reasons of yield. For this purpose the different types of apparatus which are now currently utilised in the fermentation industries may be used.

In particular, the following route can be adopted for the conduct of the operations:

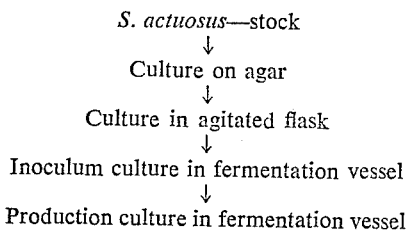

S. actuosus—stock
↓
Culture on agar
↓
Culture in agitated flask
↓
Inoculum culture in fermentation vessel
↓
Production culture in fermentation vessel The fermentation medium should contain essentially an assimilable source of carbon and an assimilable source of nitrogen, mineral substances and, optionally, growth promoting factors. All of these elements may be in the form of clearly defined substances or complex mixtures such as are found in biological products of diverse origins.

Suitable assimilable sources of carbon are provided by carbohydrates, such as glucose, sucrose, lactose, dextrins, starch and molasses or other hydrocarbon substances, such as the sugar alcohol, glycerol and mannitol, or organic acids such as lactic, citric and tartaric acids. Animal or vegetable oils such as lard or soya-bean oil may, advantageously, replace these different hydrocarbon sources or be added to them.

Suitable assimilable sources of nitrogen are extremely varied. They may be very simple chemical substances such as nitrates, mineral and organic ammonium salts, urea and aminoacids. They may also take the form of complex substances containing nitrogen principally in protein-like form; suitable such materials being, for example, casein, lactalbumin and gluten and their hydrolysates, soya-bean, peanut and fish meals, meat extracts, yeast, distillers' solubles and corn-steep.

Among the added mineral substances, certain may have a buffering or neutralizing effect, such as alkali-metal or alkaline earth metal phosphates or calcium or magnesium carbonates.

Other elements contribute to the ionic equilibrium necessary for the development of S. actuosus and the elaboration of the antibiotic, such as alkali-metal and alkaline earth metal chlorides and sulphates. Finally, certain elements act more especially as activators of the metabolic reactions of S. actuosus; examples are salts of zinc, cobalt, iron, copper and manganese.

The pH of the fermentation medium at the commencement of the culture is preferably between 6.0 and 7.5. The optimum temperature for the fermentation is 26–27° C., but satisfactory production is obtained at temperatures between 23° and 35° C. The aeration of the fermentation may be varied between fairly wide limits. It has, nevertheless, been found that an aeration rate of 0.5 to 2 litres of air per litre of broth per minute is particularly suitable. The maximum yield of the antibiotic is obtained after 3 to 5 days of culture, the time depending essentially on the medium used.

Thus, the general conditions for the culture of S. actuosus for the production of the antibiotic may be varied to a fairly wide degree and adapted to each particular circumstance.

The antibiotic 9671 RP can be isolated from fermentation cultures by various methods. The fermentation culture may be filtered at a pH between 6 and 9 but, in this case, a major part of the active material remains in the filter-cake which must also be treated to extract the product. It is, therefore, preferable to carry out the filtration at a pH range of 1 to 6. In these circumstances the active material remains in the filter-cake from which it can be extracted with a solvent selected from the aliphatic alcohols, such as methanol, ethanol, the propanols or the butanols, ketones such as acetone or methylisobutyl ketone, and esters such as ethyl acetate. It is also possible to extract the fermentation culture with a water-immiscible organic solvent from the group of aliphatic alcohols containing 4 or 5 carbon atoms, ketones and esters. In this case, the active material passes into the organic phase which is separated from the aqueous phase by filtration or centrifuging.

The crude product can be isolated from the above organic solutions by concentration of the organic solution to a small volume. The crude antibiotic precipitates on cooling or the addition of a poor solvent for 9671 RP such as petroleum ether or cyclohexane. When the antibiotic occurs in the filtrate of the culture, this solution is extracted with a water-immiscible solvent such as an aliphatic alcohol containing 4 or 5 carbon atoms, a ketone such as methylisobutyl ketone, an ester such as ethyl acetate or amyl acetate or a chlorinated solvent such as chloroform or dichlorethane. The procedure given above is then followed, i.e., concentration to a small volume and precipitation.

The antibiotic 9671 RP can then be crystallised by dissolving the precipitate obtained above in acetic acid with gentle heating and then cooling. When the crude product is too impure to be directly crystallised, or a very pure product is required, it is advantageous to submit the crude antibiotic to a two-stage purification. The first stage consists of washing the crude antibiotic with an organic solvent in which it is insoluble or only slightly soluble, for example methanol, ethanol, benzene or petroleum ether, filtering and drying. The second stage consists of chromatographing the antibiotic which has already been partially purified by the washing described above. Chromatography can be carried out using a column of alumina through which a solution of the product, in a suitable solvent, is passed. Suitable solvents are, for example, chlorinated solvents such as chloroform or dichlorethane or mixtures of one of these chlorinated solvents with a solvent in which the antibiotic is poorly soluble such as, for example, methanol or ethanol. The product is eluted with the same solvent. The eluate is concentrated and the antibiotic precipitated by the addition of a poor solvent as described above.

The products which have been thus purified are dissolved with gentle heating in aqueous or glacial acetic acid. After filtration of the solution and the addition of water, crystallisation is carried out by cooling with slow agitation.

The various methods described above may be applied successively in a varied sequence or repeated several times, according to the requirements of manufacture, in order to obtain the antibiotic 9671 RP in a suitable form for its desired use.

The present invention further includes within its scope pharmaceutical compositions which comprise the antibiotic 9671 RP together with a pharmaceutical carrier. In clinical practice the compounds of the present invention will normally be administered topically.

The following examples will serve to illustrate the invention. In these examples activity is determined throughout by a turbidimetric method using *Staphylococcus aureus* 209 P as the sensitive organism and comparing with a pure crystalline specimen of the product as standard. This activity is therefore expressed in micrograms ($\mu$g.) of standard crystalline product per mg. for solid products and in $\mu$g. of standard crystalline product per cm.$^3$ for solutions.

EXAMPLE I

A fermentation vessel (75 litres) is charged with:

| | | |
|---|---|---|
| Corn-steep (50% dried extract) | g | 800 |
| Sucrose | g | 1200 |
| Ammonium sulphate | g | 80 |
| Tap water | litres | 35 |

The pH is adjusted to about 5.2 by the addition of sodium hydroxide solution ($d=1.33$; 20 cc.). Calcium carbonate (300 g.) is then added. The medium is sterilised at 122° C. for 40 minutes by the passage of steam and after sterilisation, and cooling to 27° C., the final volume of the medium is 40 litres and the pH 7.15. The medium is then seeded with 250 cc. of a culture of *S. actuosus* in an agitated Erlenmeyer flask.

The culture in the fermentation vessel is aerated with sterile air at a rate of 3 m.$^3$/hour and agitated with a helix turning at 400 r.p.m. The temperature is kept at 27° C. The pH of the medium remains at its initial value (7.15) for 4 hours and then falls slowly to reach 6.85. The development of the organism corresponds to this lowering of the pH and it is satisfactory to seed the production culture 28 hours after the initial seeding.

The production culture is carried out in a fermentation vessel (350 litres) charged with the following materials:

| | | |
|---|---|---|
| Soya flour | kg | 8 |
| Distillers' solubles | kg | 1 |
| Glucose (hydrated) | kg | 1 |
| Soya oil | litres | 4 |
| Calcium carbonate | kg | 2 |
| Sodium chloride | kg | 2 |
| Water | litres | 175 |

The pH of the medium before sterilisation is 6.95. The medium is sterilised at 122° C. for 40 mintues by the passage of steam. After sterilisation, and cooling to 27° C., the final volume of the medium is 200 litres and the pH 7.20. The medium is then seeded with 20 litres of the preceding culture from the 75 litre fermentation vessel. The medium is agitated with a turbine turning at 205 r.p.m., aerated with 10 m.$^3$/hour of sterile air and the temperature maintained at 27° C. The pH falls slowly for 24 hours after which it rises again. The production of the antibiotic commences with this rise in the pH. The completion of the fermentation is not marked by any alteration in the curve of the rise of pH. It occurs at the end of about 90 hours and the activity of the medium is then 295 $\mu$g./cc.

EXAMPLE II

A fermentation culture (190 litres; titre 295 $\mu$g./cc. as in Example I) is placed in a container fitted with an agitator. The culture is stirred for 1 hour with butanol (110 litres), the pH being adjusted to 5 with dilute hydrochloric acid. A filtration adjuvant (19 kg.) is then added and the mixture filtered through a filter-press. The filter-cake is washed with water (50 litres). The organic phase is separated and washed with water (11 litres) at pH 9, and then with water (11 litres) at pH 5. The organic layer is again separated and concentrated under reduced pressure to 1/100 of the initial volume of the culture, i.e. 1.9 litres. After standing for 24 hours in a cold room, the precipitate obtained is separated, washed and dried, giving a crude product (88 g.) having an activity of 434 $\mu$g./mg.

EXAMPLE III

The product obtained in Example II (70 g.), titre 434 $\mu$g./mg., is suspended in methanol (1400 cc.) and agitated for 1 hour at 30° C. The insoluble matter is separated and dried, giving a product (29 g.) having an activity of 825 $\mu$g./mg. This product is dissolved in a chloroform-methanol mixture (90:10 by volume; 750 cc.). The solution is filtered and then chromatographed through a column containing alumina (600 g.; height of column 61 cm., diameter 3.5 cm.). The chromatogram is developed and eluted with the same chloroform-methanol mixture (1500 cc.). The rich fractions are combined, concentrated under reduced pressure to 40 cc. and precipitated with hexane (400 cc.). The precipitate is separated, washed and dried, giving a product (23 g.) having an activity of 950 $\mu$g./mg. A suspension of the latter product (10 g.) in glacial acetic acid (200 cc.) is heated to 50° C. for 5 minutes. The solution is filtered, water added (2.5 cc.) and cooled slowly. The crystals obtained are separated, washed and dried, giving a pure product (8 g.) having an activity of 1000 $\mu$g./mg.

EXAMPLE IV

A fermentation culture (170 litres) having an activity of 166 $\mu$g./cc. is placed in a container fitted with an agitator and adjusted to pH 5 with dilute sulphuric acid. Ethyl acetate (95 litres) is added and the mixture agitated for 1 hour. The organic phase is separated by centrifuging in a centrifuge capable of separating an organic solvent from an aqueous suspension of insoluble material (Westphalia SKOG 205). The organic solution (82 litres) which is recovered is washed and then concentrated under reduced pressure to 1.7 liters. After treatment as described in Example II, a product (61 g.) having an activity of 320 $\mu$g./mg. is obtained. This product (35 g.) is suspended in methanol (700 cc.) and agitated for 1 hour at 30° C. The precipitate is separated and dried, giving a product (11.1 g.) having an activity of 725 $\mu$g./mg. By dissolving this product (10 g.) in glacial acetic acid (200 cc.) and treating as described in Example III, a crystalline product (6.3 g.) is obtained having an activity of 925 $\mu$g./mg.

We claim:

1. An antibiotic, herein designated 9671 RP, which is a yellow substance, crystallising as fine needles, melting point 310–320° C. with decomposition on a Maquenne block, and having an optical rotation $[\alpha]_D^{20}=+38°$ ($c=1$, pyridine), analysing with the elementary composition C, 49.6%; H, 4.0%; O, 16.7%; N, 14.4%; S, 15.75–15.80%, having an ultra-violet spectrum in solution in water containing dimethylformamide exhibiting two absorption maxima at 242 m$\mu$ ($E_{1\,cm.}^{1\%}=525$) and 322 m$\mu$ ($E_{1\,cm.}^{1\%}=229$)

exhibiting the following principal infra-red absorption bands 3350 strong, 3125 shoulder, 2930 shoulder, 1745 medium, 1655 very strong, 1532 very strong, 1484 strong, 1425 medium, 1385 weak, 1342 medium, 1308 medium, 1235 medium, 1210 medium, 1168 medium, 1150 medium, 1112 shoulder, 1101 medium, 1061 medium, 1017 medium, 990 weak, 940 weak, 918 medium, 890 shoulder, 843 medium, 822 weak, 790 medium and 752 strong, the said antibiotic being soluble in chloroform, dioxane, pyridine, dimethylformamide and dimethylsulphoxide, slightly soluble in methanol, ethanol, ethyl acetate and benzene and insoluble in water and petroleum ether.

2. A method for the production of an antibiotic, which comprises culturing aerobically the micro-organism *S. actuosus*, identified by Culture Collection number NRLL 2954 at 23–35° C., on a nutrient medium containing assimilable sources of carbon and nitrogen and having an initial pH of 6.0 to 7.5 and separating from the culture by extraction with an organic solvent an antibiotic which is a yellow substance, crystallising as fine needles, melting point 310–320° C. with decomposition on a Maquenne block, and having an optical rotation $[\alpha]_D^{20} = +38°$ ($c=1$, pyridine), analysing with the elementary composition C, 49.6%; H, 4.0%; O, 16.7%; N, 14.4%; S, 15.75–15.80%, having an ultra-violet spectrum in solution in water containing dimethylformamide exhibiting two absorption maxima at $$242 \text{ m}\mu \ (E_{1\,cm.}^{1\%} = 525) \text{ and } 322 \text{ m}\mu \ (E_{1\,cm.}^{1\%} = 229)$$

exhibiting the following principal infra-red absorption bands 3350 strong, 3125 shoulder, 2930 shoulder, 1745 medium, 1655 very strong, 1532 very strong, 1484 strong, 1425 medium, 1385 weak, 1342 medium, 1308 medium, 1235 medium, 1210 medium, 1168 medium, 1150 medium, 1112 shoulder, 1101 medium, 1061 medium, 1017 medium, 990 weak, 940 weak, 918 medium, 890 shoulder, 843 medium, 822 weak, 790 medium and 752 strong, the said antibiotic being soluble in chloroform, dioxane, pyridine, dimethylformamide and dimethylsulphoxide, slightly soluble in methanol, ethanol, ethyl acetate and benzene, and insoluble in water and petroleum ether.

3. A method according to claim 2, wherein the culturing is effected by the submerged aerobic culture technique with an aeration rate of 0.5 to 2 litres of air per litre of nutrient medium per minute for a period of 3 to 5 days.

4. A method according to claim 2, wherein the temperature of the culture is maintained at 26–27° C.

5. A method according to claim 2 wherein the separation is effected at a pH of 1 to 6.

6. A method according to claim 2, wherein the antibiotic separated from the culture medium is purified by crystallisation from solution in acetic acid.

References Cited in the file of this patent

J. Antibiotics (Tokyo), Ser. A 14, 196, 255 (1961).
J. Am. Chem. Soc. 82, 4747 (1960); 83, 3906 (1961).